United States Patent [19]
LaMonica

[11] Patent Number: 4,685,239
[45] Date of Patent: Aug. 11, 1987

[54] SPEAR POINT FOR FISHING SPEAR GUNS
[75] Inventor: Joseph B. LaMonica, Orange, Calif.
[73] Assignee: Ann Runnells, Orange, Calif.
[21] Appl. No.: 913,321
[22] Filed: Sep. 30, 1986
[51] Int. Cl.$^4$ ............................................. A01K 81/04
[52] U.S. Cl. ..................................................... 43/6
[58] Field of Search ................ 43/6; 42/1.14; 89/1.34; 102/371, 399, 519, 504

[56] References Cited
U.S. PATENT DOCUMENTS

| | | | |
|---|---|---|---|
| 3,102,525 | 9/1963 | Englis | 43/6 |
| 3,320,941 | 5/1967 | Houghton | 43/6 |
| 3,878,788 | 4/1975 | Ah Sam | 43/6 |
| 3,945,642 | 3/1976 | Henthorn | 43/6 |

Primary Examiner—M. Jordan
Attorney, Agent, or Firm—Plante, Strauss, Vanderburgh

[57] ABSTRACT

This invention comprises a pointed spear head for sport fishing spear guns which is formed of a metal having a Rockwell hardness of at least 30 and distally having a sharply pointed end. At its opposite end, the spear head has an annular groove and intermediate its ends, the spear head has a pair of opposite flats with a single bore extending transversely therethrough, between the flats. A pair of folding wings, each having side flanges with apertures which are aligned with the transverse bore are received over the flatted portions of the head with their apertures aligned with the single through bore of the shaft and with a pin extending therethrough to pivotally secure the wings to the shaft. The spear point is provided with a slidable sleeve retainer which can be slipped over the ends of the wings to retain them in their folded positions. The spear point head of the hardened steel is connected to a shaft adapter of intermediate hardness, e.g., stainless steel having a hardness from about 10 to about 20 Rockwell and, for this purpose, the adapter has a central bore which receives the grooved end of the spear point head. The adapter has its opposite sidewalls internally upset or indented into the annular groove to secure the spear point permanently to the retainer while permitting its freedom of rotation. The opposite end of the adapter has a conventional threaded end such as a distal threaded boss or internally threaded bore to permit its threaded attachment to the main shaft of a spear.

11 Claims, 3 Drawing Figures

SPEAR POINT FOR FISHING SPEAR GUNS

BACKGROUND OF THE INVENTION

Spear points for spear guns have conventionally been formed with a shaft machined from stainless steel. Because substantial machining is required for the conventional spear point, the material used for the shaft from which the spear point is formed is typically 300 stainless steel, which is a relatively soft material having a hardness of about 15 Rockwell.

The spear points used for sport fishing have a pointed head having a reduced diameter shank portion. A sleeve is rotatably mounted over the reduced diameter shank portion and apertures are provided on opposite sides of the sleeve in which pins are mounted to pivotally attach a pair of folding wings. The wings fold against the shaft and are provided with a resilient spring and a sleeve retainer is slidably mounted on the point, adjacent the rear of the head. The retainer is slid along the shaft to overlie the folded ends of the wings and retain them in their folded positions, against the bias of a resilient spring.

The aforementioned construction requires considerable machining. It is necessary to manufacture the spear point in at least two parts, requiring machining of a threaded attachment between the two parts. It is also necessary to machine one or both mating ends of the two head portions to reduced diameters to receive the aforementioned sleeve which supports the folding wings. The rear portion of the head is also machined with necessary attachment means, typically with an internally threaded bore or externally threaded shank to attach the head to the main shaft of the spear. The aforementioned machining precludes the use of very hard machine steel such as steels having hardness values greater than about 30 Rockwell, e.g. stainless steel grade 17-4 which has a hardness of 44 Rockwell.

The use of very hard machine steel for the heads of spear points is desired since the softer steels currently in use do not stand up under the abuse typically experienced with the spear heads. The spear heads often hit rocks, breaking or bending their points, and thus requiring frequent replacement and repair. While the use of very hard machine steels for this service would greatly reduce or eliminate the frequency of maintenance heretofore required and extend the service life of the spear heads, no one heretofore has employed such steels because of the extensive machining required with the conventional spear head design.

BRIEF DESCRIPTION OF THE INVENTION

This invention comprises a pointed spear head for sport fishing spear guns which is formed of a metal having a Rockwell hardness of at least 30 and distally having a sharply pointed end. At its opposite end, the spear head has an annular groove and intermediate its ends, the spear head has a pair of opposite flats with a single bore extending transversely therethrough, between the flats. A pair of folding wings, each having side flanges with apertures which are aligned with the transverse bore are received over the flatted portions of the head with their apertures aligned with the single through bore of the shaft and with a pin extending therethrough to pivotally secure the wings to the shaft. The spear point is provided with a slidable sleeve retainer which can be slipped over the ends of the wings to retain them in their folded positions. The spear point head of the hardened steel is connected to a shaft adapter of intermediate hardness, e.g., stainless steel having a hardness from about 10 to about 20 Rockwell and, for this purpose, the adapter has a central bore which receives the grooved end of the spear point head. The adapter has its opposite sidewalls internally upset or indented into the annular groove to secure the spear point permanently to the retainer while permitting its freedom of rotation. The opposite end of the adapter has a conventional threaded end such as a distal threaded boss of internally threaded bore to permit its threaded attachment to the main shaft of a spear.

BRIEF DESCRIPTION OF THE DRAWINGS

The invention will be described with reference to the FIGS. of which.

DESCRIPTION OF PREFERRED EMBODIMENT

Figure 1:
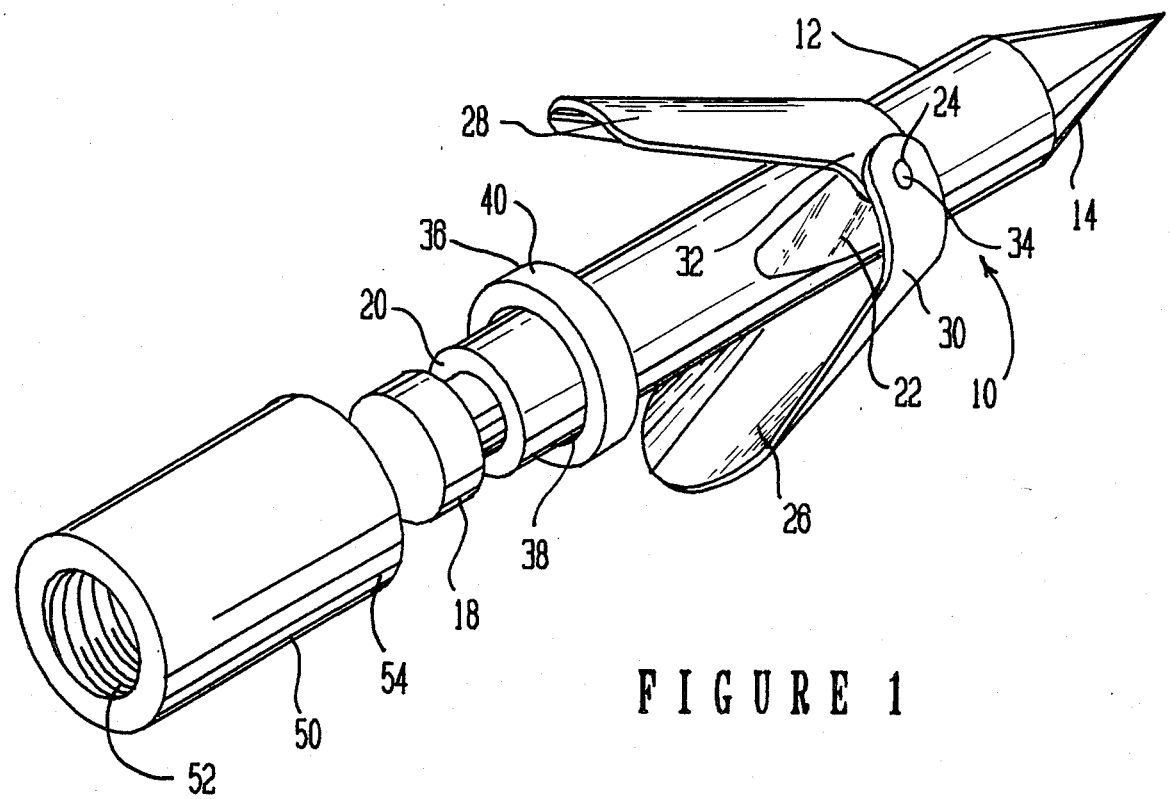
FIG. 1 is a perspective view of the spear point head and the adapter of the invention.

Referring now to FIG. 1, the spear point head 10 of the invention has a main shaft 12 which is formed of a hard machine steel such as a stainless steel having a hardness from about 30 to about 50 Rockwell scale C, preferably from 40 to about 50 Rockwell. A very suitable material for this purpose is grade 17-4 stainless steel which has a hardness of about 45 Rockwell scale C.

Shaft 12 is a cylindrical shaft which is ground at its forward end to provide a spear point 14 with a relatively long sharpened point, typically with a included angle of the point 14 which is from about 10 to about 20 degrees.

At its opposite end 18, the shaft 12 has a single annular groove 20. Intermediate its ends, and approximately at the mid- point of the spear point head 10, the spear point has a pair of opposite flats such as 22. A single through aperture (not shown) transversely extends through the shaft 12 between the opposite flats such as 22 and this through aperture receives a pin 24 that pivotally secures the folding wings 26 and 28 on the shaft. Wings 26 and 28 have side flanges such as 30 and 32 and are provided with a central aperture such as 34 that is received over the end of shaft 24. The opposite ends of shaft 24 are riveted or provided with other permanent fasteners to permanently secure the assembly of the folding wings 26 and 28 to shaft 12.

The shaft is also provided with a slidable wing retainer sleeve 36. Sleeve 36 has an end flange 38 with a central through aperture that is received over the end of shaft 12 and an annular loop or cylindrical ring 40 to provide for its aplication over the folded ends of the wings, thereby retaining the wings in a folded position.

The invention is also provided with a sleeve adapter 50 which is a tubular sleeve having its rear end provided with internal threads 52. At its opposite end 54, the adapter receives the grooved end 18 of the spear point 10.

Figure 2:
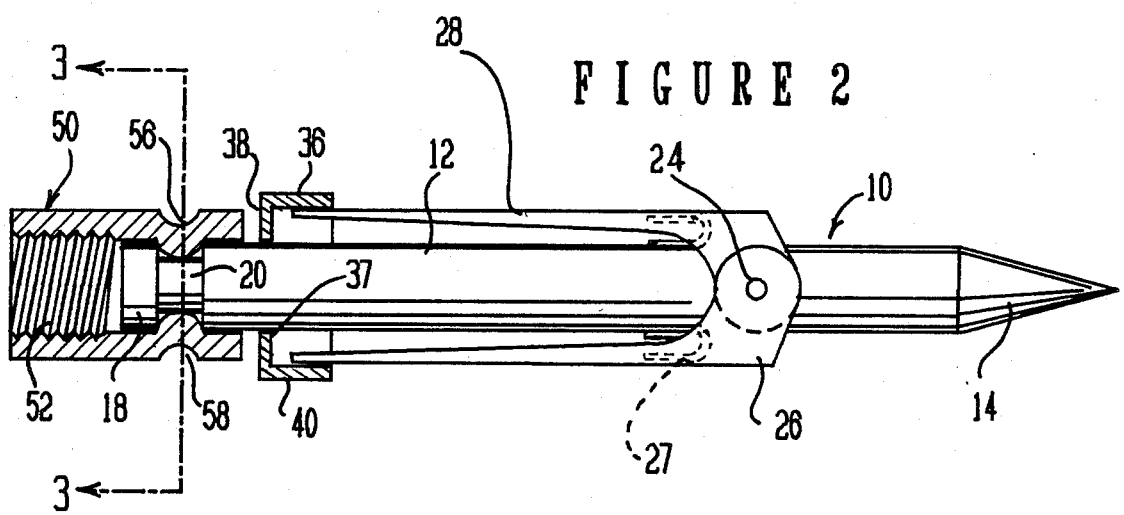
FIG. 2 is an elevational view of the spear point head with the adapter shown in cross-sectional view.

Referring now to FIG. 2, the spear point and adapter are shown in greater detail. As shown in FIG. 2, the spear point head 10 has a sharply pointed end 14 and its opposite end 18 has a relatively wide annular groove 20. The retainer sleeve 38, which is shown in sectional view, is slidably received with the central aperture 37 of its flange 38 received over the shaft 12.

The assembly is also provided with resilient means such as springs 27 which are received against the inside surfaces such as of the wings when the wings are in the folded position and which resiliently bias the wings outwardly into their erected positions.

As shown in FIG. 2, the sleeve retainer 36 has its annular ring 40 projecting forwardly to grasp the ends of the folded wings 26 and 28, against the bias of spring 27.

The adapter 50 is a tubular sleeve which at its rear end bears internal threads 52 for receiving the externally threaded boss end of a spear shaft. At its opposite end, sleeve 50 has a pair of opposite upsets 56 and 58 in its wall portion, opposite the annular groove 20 to serve as a permanent retention of the shaft 12 within adapter 50.

Figure 3:
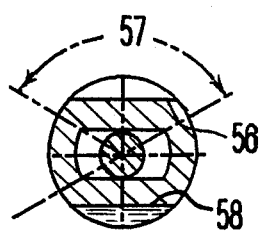
FIG. 3 is a sectional view along lines 3—3' of FIG. 2.

Referring now to FIG. 3, the shape and relative size of the upsets 56 and 58 is illustrated. FIG. 3 is a sectional view along line 3—3' of FIG. 2, which extends though the upset wall portions 56 and 58. As there illustrated, each of the opposite walls is internally upset over an annular arc 57 of about 120 degrees. The upset portions 56 and 58 are symmetrically spaced, thereby providing an angle of 60 degrees between each of the upset portions 56 and 58.

The spear point of the invention can be formed using a relatively soft material such as grade 300 stainless steel for the adapter sleeve 50. This sleeve can be upset to provide the opposite indentations 56 and 58 using a simple punch machine. The upset portions are received within the groove 20 of the very hard shaft 12 and the upsetting operation does not cause any deformation of the annular groove 20. This ensures that the spear point 10 is freely rotatable within the adapter 50. The only machining required to form the hard spear point is the forming of the annular groove 20, sharpening of the pointed end 14, grinding opposite flats 22 and boring a single through bore 33 through the shaft to receive the pin 34. These relatively simple machining operations can be performed with conventional tools without requiring any extensive metal cutting operations. This permits use of the aforementioned hard machine steels for the spear point and, as a consequence, spear points of long life and durability can be readily provided.

The invention has been described with reference to the illustrated and presently preferred embodiment. It is not intended that the invention be unduly limited by this disclosure of the presently preferred embodiment. Instead, it is intended that the invention be defined, by the means, and their obvious equivalents, set forth in the following claims:

What is claimed is:

1. A spear point for fishing spear guns which comprises:
   a. a spear point shaft formed of a metal having a Rockwell hardness of at least 30, and distally bearing a pointed end;
   b. an annular groove about the opposite end of said shaft from said pointed end; and
   c. a spear point retainer sleeve formed of a softer steel than said shaft, and receiving in one end, said opposite end of said shaft, with an internally upset wall in said one end, opposite said annular groove and projecting therein, whereby said spear point is permanently secured to said spear point retainer sleeve.

2. The spear point of claim 1 wherein said upset wall comprises a pair of indentations in the wall of said spear point retainer sleeve aligned with and extending into said annular groove of said shaft.

3. The spear point of claim 2 wherein said indentations are straight transverse indentations spaced at 60 degree angular increments, and each extending over an arc of 120 degrees.

4. The spear point of claim 1 including:
   a. a pair of opposite flats on said shaft intermediate its length with a bore extending transversely through said shaft, between said flats; and
   b. a pair of wings having side flanges with apertures aligned with said bore in said shaft and with a pin pivotally securing said wings to said shaft, whereby said wings can be pivoted between folded positions about said shaft and extended positions at approximately right angles to said shaft.

5. The spear point of claim 1 including:
   a. resilient means biasing said wings into said extended positions; and
   b. a wing retainer sleeve slidably received on said shaft and having an axial lip received over the ends of said wings in said their folded positions.

6. The spear point of claim 1 including attachment means on said spear point retainer sleeve to secure it to a main spear shaft.

7. The spear point of claim 6 wherein said attachment means are internal threads which engage the threaded end of a main spear shaft.

8. A spear point for fishing spear guns which comprises:
   a. a spear point shaft formed of a metal having a Rockwell hardness of at least 30, and distally bearing a pointed end;
   b. a pair of opposite flats on said shaft intermediate its length with a bore extending transversely through said shaft, between said flats;
   c. a pair of wings having side flanges with apertures aligned with said bore in said shaft and with a pin pivotally securing said wings to said shaft, whereby said wings can be pivoted between folded positions about said shaft and extended positions at approximately right angles to said shaft;
   d. resilient means biasing said wings into said extended positions;
   e. a wing retainer sleeve slidably received on said shaft and having an axial lip received over the ends of said wings in said their folded positions;
   f. an annular groove about the opposite end of said shaft from said pointed end;
   g. a spear point retainer sleeve receiving said opposite end of said shaft and having an internally upset point is permanently secured within said spear point retainer sleeve; and
   h. attachment means to secure said retainer to a main spear shaft.

9. The spear point of claim 8 wherein said attachment means are internal threads which engage the threaded end of a main spear shaft.

10. The spear point of claim 8 wherein said upset wall comprises a pair of indentations in the wall of said spear point retainer sleeve aligned with and extending into said annular groove of said shaft.

11. The spear point of claim 10 wherein said indentations are straight transverse indentations spaced at 60 degree angular increments, and each extending over an arc of 120 degrees.

* * * * *

UNITED STATES PATENT AND TRADEMARK OFFICE
CERTIFICATE OF CORRECTION

PATENT NO. : 4,685,239
DATED : August 11, 1987
INVENTOR(S) : Joseph B. LaMonica

It is certified that error appears in the above—identified patent and that said Letters Patent is hereby corrected as shown below:

Claim 8, line 52, after "upset" insert --wall about said annular groove, whereby said spear --

Signed and Sealed this

Twenty-fourth Day of November, 1987

*Attest:*

DONALD J. QUIGG

*Attesting Officer*  *Commissioner of Patents and Trademarks*